(12) United States Patent
Ohno

(10) Patent No.: US 8,463,437 B2
(45) Date of Patent: Jun. 11, 2013

(54) ROBOT

(75) Inventor: Nobuyuki Ohno, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 927 days.

(21) Appl. No.: 12/329,101

(22) Filed: Dec. 5, 2008

(65) Prior Publication Data

US 2009/0149992 A1    Jun. 11, 2009

(30) Foreign Application Priority Data

Dec. 10, 2007   (JP) ................................ 2007-318887

(51) Int. Cl.
*G05B 19/18* (2006.01)
*G05D 1/02* (2006.01)
*G06F 19/00* (2011.01)

(52) U.S. Cl.
USPC ............. 700/253; 700/245; 700/255; 701/26; 318/568.12; 901/1

(58) Field of Classification Search
USPC ........ 701/41, 26, 300, 23, 301, 302; 340/431, 340/437, 435; 700/258, 253, 245, 250, 255; 318/568.12; 180/271, 14.1; 901/1
See application file for complete search history.

(56) References Cited

U.S. PATENT DOCUMENTS

| | | | | |
|---|---|---|---|---|
| 5,999,865 A * | 12/1999 | Bloomquist et al. | ............ | 701/25 |
| 6,393,362 B1 * | 5/2002 | Burns | ............ | 701/301 |
| 6,926,374 B2 * | 8/2005 | Dudeck et al. | ............ | 303/191 |
| 7,076,346 B2 * | 7/2006 | Sturges et al. | ............ | 701/29 |
| 7,603,235 B2 * | 10/2009 | Makela et al. | ............ | 701/301 |
| 7,801,644 B2 * | 9/2010 | Bruemmer et al. | ............ | 700/249 |
| 7,894,939 B2 * | 2/2011 | Zini et al. | ............ | 700/245 |
| 2004/0093650 A1 * | 5/2004 | Martins et al. | ............ | 901/1 |
| 2006/0047390 A1 * | 3/2006 | Scherl et al. | ............ | 701/41 |
| 2006/0111820 A1 * | 5/2006 | Goetting et al. | ............ | 701/29 |
| 2010/0191421 A1 * | 7/2010 | Nilsson | ............ | 701/41 |

FOREIGN PATENT DOCUMENTS

JP   02-231609   9/1990
JP   2007-160428   6/2007

OTHER PUBLICATIONS

Sakata et al., "Wheelchair User Support System Using Humanoid Robots" SICE Annual Conference in Sapporo, Aug. 4-6, 2004, pp. 1650-1655.*

* cited by examiner

*Primary Examiner* — Christine Behncke
(74) *Attorney, Agent, or Firm* — Rankin, Hill & Clark LLP

(57) ABSTRACT

A robot that is capable of traveling while moving an object such that the object and the robot itself will not step out of a predetermined area is provided. If a traveling requirement that the robot and the object remain within a pathway area is not met, then an action scheme of the robot is corrected so as to meet the traveling requirement. Then, the robot travels while moving the object according to the corrected action scheme, thus enabling the robot to travel while moving the object such that both the object and the robot do not step out of the pathway area.

5 Claims, 5 Drawing Sheets

ROBOT

BACKGROUND OF THE INVENTION

1. Field of the Invention

The present invention relates to a robot which autonomously travels.

2. Description of the Related Art

Hitherto, there has been proposed a technical method whereby motions of a robot that travels while moving an object is controlled. The motions of the robot are controlled such that the position of a representative point of the object, such as a cart, follows a desired positional trajectory and also the posture of the object follows a desired azimuth trajectory (refer to Japanese Patent Application Laid-Open No. 2007-160428).

However, for the robot to travel while smoothly moving the object, the robot is required to move the object without letting the object come in contact with the wall or the like of a hallway and also to keep itself from coming in contact with the wall or the like of the passage.

SUMMARY OF THE INVENTION

An object of the present invention is to provide a robot which is capable of traveling while moving an object such that the object and the robot itself remain in a predetermined area.

A robot according to a first aspect of the invention is equipped with a controller which controls the motions of the robot according to an action scheme when the robot travels while moving an object. The controller includes: a first processing element which recognizes a predicted position and a predicted azimuth in the future of the robot and the object, respectively, according to the action scheme and also recognizes a pathway area; a second processing element which determines, on the basis of the result of the recognition by the first processing element, whether a traveling requirement that the whole object and the whole robot remain within the pathway area in the future is met, and a third processing element which corrects the action scheme on condition that the second processing element has determined that the traveling requirement is not met.

According to the robot of the first aspect of the invention, if the traveling requirement that the robot and the object will remain within the pathway area is not met, then the action scheme of the robot is corrected to meet the traveling requirement. This enables the robot to travel while moving the object such that the object and the robot itself will remain within the pathway area according to the corrected action scheme.

In a robot according to a second aspect of the invention, the third processing element in the robot according to the first aspect of the invention corrects the action scheme of the robot so as to change the traveling direction of the robot.

According to the robot of the second aspect of the invention, the traveling direction of the robot defined by the action scheme before a correction is changed to the traveling direction defined by the corrected action scheme. This allows the robot to travel while moving the object such that the object and the robot itself will remain within the pathway area.

In the robot according to the second aspect of the invention, a robot according to a third aspect of the invention corrects the action scheme of the robot so as to reduce the traveling speed of the robot on condition that the second processing element determines whether changing the traveling direction of the robot satisfies the traveling requirement and that the third processing element determines that the traveling requirement will not be satisfied even after the traveling direction of the robot is changed.

According to the robot of the third aspect of the invention, the traveling speed of the robot is reduced if changing the traveling direction alone does not make it easy for the robot itself and the object to remain in the pathway area when the robot travels while moving the object after changing the traveling direction. Reducing the traveling speed of the robot allows the traveling direction to be changed more than in the case where the traveling speed is not changed. Thus, changing the traveling direction relatively significantly makes it possible to prevent the object and the robot from stepping out of the pathway area.

DESCRIPTION OF THE PREFERRED EMBODIMENTS

The following will describe an embodiment of a robot in accordance with the present invention with reference to the accompanying drawings.

Figure 1:
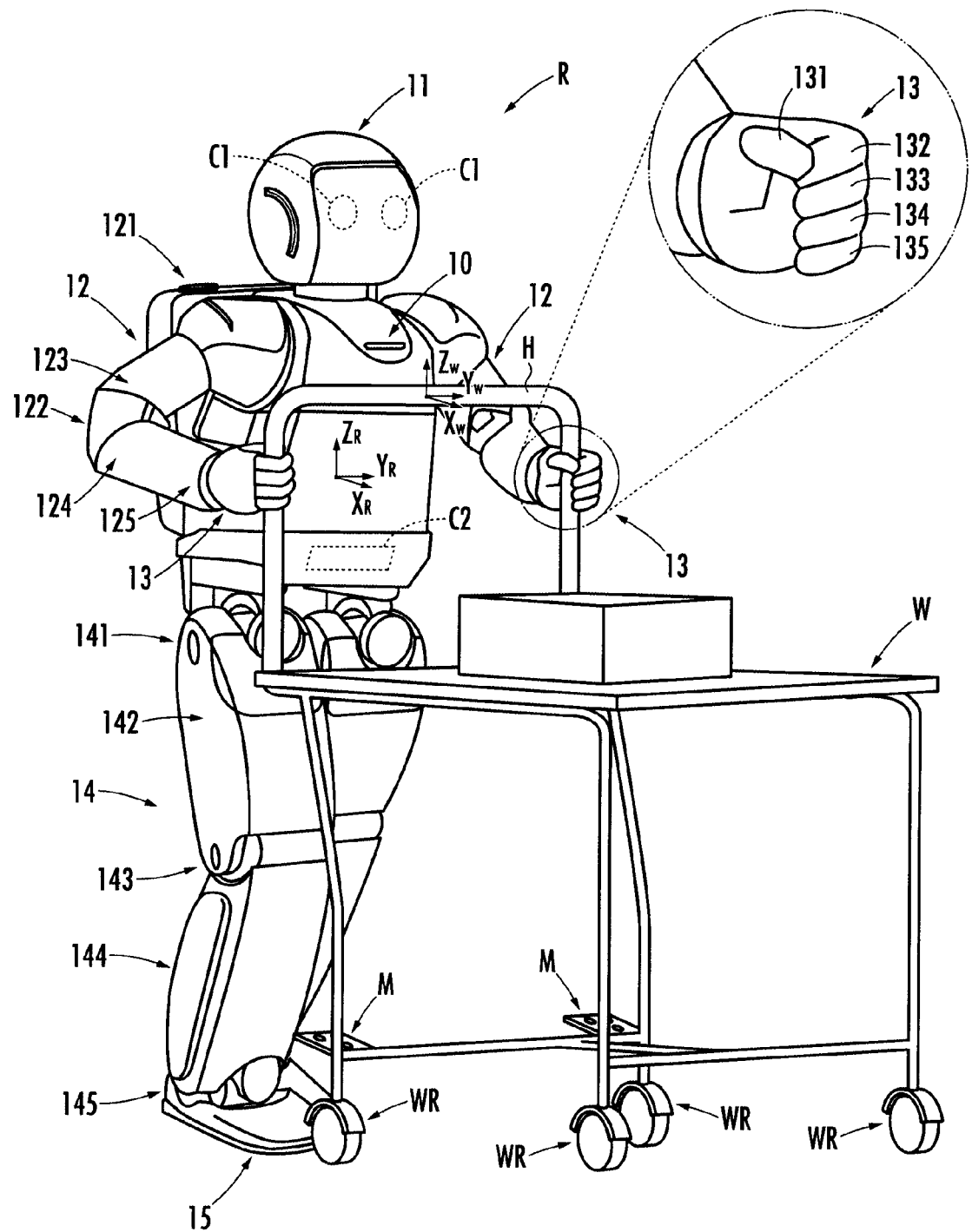
FIG. 1 is an explanatory diagram illustrating the construction of a robot in accordance with the present invention.
Figure 2:
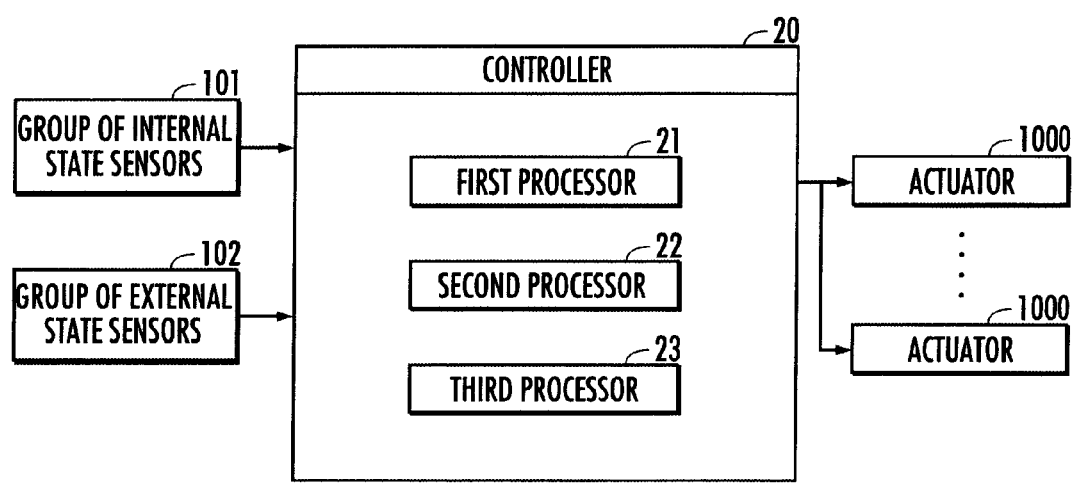
FIG. 2 is a block diagram of a controller of the robot in accordance with the present invention.

A robot R illustrated in FIG. 1 is a legged mobile robot having a body 10, a head 11 disposed on the top of the body 10, right and left arms 12 provided at an upper portion of the body 10 such that they extend from both sides of the upper portion, hands 13 provided on the distal ends of the right and left arms 12, and right and left legs 14 extendedly provided downward from the bottom of the body 10, as with a human being. The robot R is equipped with a controller 20 which controls the motions thereof.

The body 10 is constructed of an upper section and a lower section vertically connected such that they may relatively rotate about a yaw axis. The head 11 is capable of making a motion, such as moving about the yaw axis, with respect to the body 10. Each of the arms 12 has a first arm link 122 and a second arm link 124. The body 10 is connected with the first arm link 122 through the intermediary of a shoulder joint 121, and connected with the first arm link 122 and the second arm link 124 through the intermediary of an elbow joint 123. The second arm link 124 and the hand 13 are connected through the intermediary of a carpal joint 125. Each of the shoulder joints 121 has the freedom of rotation about a roll axis, a pitch axis, and the yaw axis, each of the elbow joints 123 has the freedom of rotation about the pitch axis, and the carpal joint 125 has the freedom of rotation about the roll axis, the pitch axis, and the yaw axis. A six-axis force sensor is provided in the vicinity of the carpal joint 125. Each of the legs 14 has a first leg link 142, a second leg link 144, and a foot 15. The body 10 and the first leg link 142 are connected through the intermediary of a hip joint 141, the first leg link 142 and the second leg link 144 are connected through the intermediary of a knee joint 143, and the second leg link 144 and the foot 15 are connected through the intermediary of a foot joint 145.

The hip joint 141 has the freedom of rotation about the roll axis, the pitch axis and the yaw axis, the knee joint 143 has the freedom of rotation about the pitch axis, and the foot joint 145 has the freedom of rotation about the roll axis and the pitch axis. Each of the hands 13 is equipped with five finger mechanisms 131 to 135, which extend from the palm portion and which correspond to the thumb, the forefinger, the middle finger, the third finger, and the little finger, respectively, of a human hand. The finger mechanisms are disposed such that the first finger mechanism 131 opposes the four finger mechanisms 132 to 135, which are arranged side by side.

The first finger mechanism 131 has three link members corresponding to the first metacarpal bone and the proximal joint and the distal joint of the thumb of a human hand, and an elastic cover which covers the three link members. The three link members are connected through the intermediary of joints which correspond to the proximal joint of the first metacarpal bone, the metacarpophalangeal joint of the thumb and the interphalangeal joint of the thumb, respectively, of a human hand in this order from the palm side. The first finger mechanism 131 can be bent at each joint in response to forces transmitted from a motor accommodated in the palm portion through the intermediary of a motive power transmitting mechanism constructed of a speed reducer and the like. The motive power transmitted to the first finger mechanism 131 from the motor is controlled by the controller 20.

The finger mechanisms 132 to 135 have the same constructions as those of the finger mechanisms disclosed in, for example, Japanese Patent Application Laid-Open No. 2003-181787, and each of the finger mechanisms share substantially the same construction. For instance, the fifth finger mechanism 135 has three link members corresponding to the proximal joint, the middle joint, and the distal joint, respectively, of the little finger of a human hand, and an elastic cover which covers the three link members. The three link members are connected through the intermediary of joints corresponding to the metacarpophalangeal joint, the proximal interphalangeal joint, and the distal interphalangeal joint, respectively, of the little finger of a human hand in this order from the palm portion.

The fifth finger mechanism 135 can be bent inward at each joint in response to a motive power transmitted from a motor (not shown) serving as a motive power source through the intermediary of a motive power transmitting mechanism. As with the first finger mechanism 131, the motive power transmitted to the fifth finger mechanism 135 from the motor is controlled by the controller 20.

Of the finger mechanisms 131 to 135, a plurality of finger mechanisms may be driven by the same single motor, or each finger mechanism may be separately driven by a single motor, as with the first finger mechanism 131 in the present embodiment. Further, the motive power transmitting mechanism may be constructed of wires, pulleys or the like, as disclosed in the aforesaid Japanese Patent Application Laid-Open No. 2003-181787, or any other construction may be used as long as the construction is capable of transmitting the motive power of a motor to cause each finger mechanism to bend and stretch.

The controller 20, which is composed primarily of a CPU, a ROM, a RAM, and an I/O system, controls the action of the robot R by controlling the operation of actuators 1000 on the basis of output signals of a group of internal state sensors 101 and output signals of a group of external state sensors 102 according to an action scheme stored in a storage device. The internal state includes, for example, the position of a representative point, such as the center of gravity, of the robot R in a fixed coordinate system, the azimuth of a traveling direction of the robot R, a posture defined by the angles or the like of joints, such as the hip joint 141 and the knee joint 143, and forces acting on the robot R from outside via the hands 13.

The group of internal state sensors primarily includes a GPS receiver, which receives signals indicative of latitudes and longitudes defining the positions of the robot R, from an artificial satellite, a yaw rate sensor which outputs signals based on angular velocities about a Z-axis of the robot R, an acceleration sensor which outputs signals based on acceleration in an X-direction and the like of the robot R, a rotary encoder which outputs signals based on the angles of joints, and a six-axis force sensor which outputs signals based on forces acting on the hands 13 from outside.

The external state of the robot R includes, for example, the positions of a representative point of an object W in a fixed coordinate system or a robot coordinate system, the postures of the object W, and pathway areas defined by the walls or the like of hallways. The group of external state sensors includes primarily a pair of right and left head cameras $C_1$, such as CCD cameras, infrared cameras or the like, which are installed in the head 11 to image the area ahead of the robot R and which are capable of sensing light in various frequency bands, and a waist camera $C_2$ installed at a lower portion of the body 10 to measure the position, the azimuth and the like of an object by detecting the light ray of a near-infrared laser beam reflected from the object, the laser beam being emitted downward in front of the robot R (refer to FIG. 1).

The controller 20 may be a distributed controller constructed of a main control unit and a single or a plurality of sub-control units connected through an internal network of the robot R. The controller 20 has a first processor 21, a second processor 22, and a third processor 23. The first processor 21 recognizes the predicted positions and the predicted azimuths of the robot R and the object W moved by the robot R in the future according to an action scheme, and also recognizes a pathway area. The second processor 22 determines whether a traveling requirement is met. The traveling requirement is that the whole object W and the whole robot R will remain within a pathway area in the future, and the determination is made on the basis of the recognition results provided by the first processor 21. The third processor 23 corrects the action scheme when the second processor 22 determines that the traveling requirement is not met.

The "recognition" of information by a constituent element in the present invention means to carry out any information processing required to prepare information for further information processing. Such information processing includes, for example, the retrieval of information from a database, reading information from a storage device, such as a memory, measuring, calculating, estimating or judging information on the basis of output signals of sensors and the like, and storing information obtained by measurement or the like in a memory by the constituent element.

Figure 4:
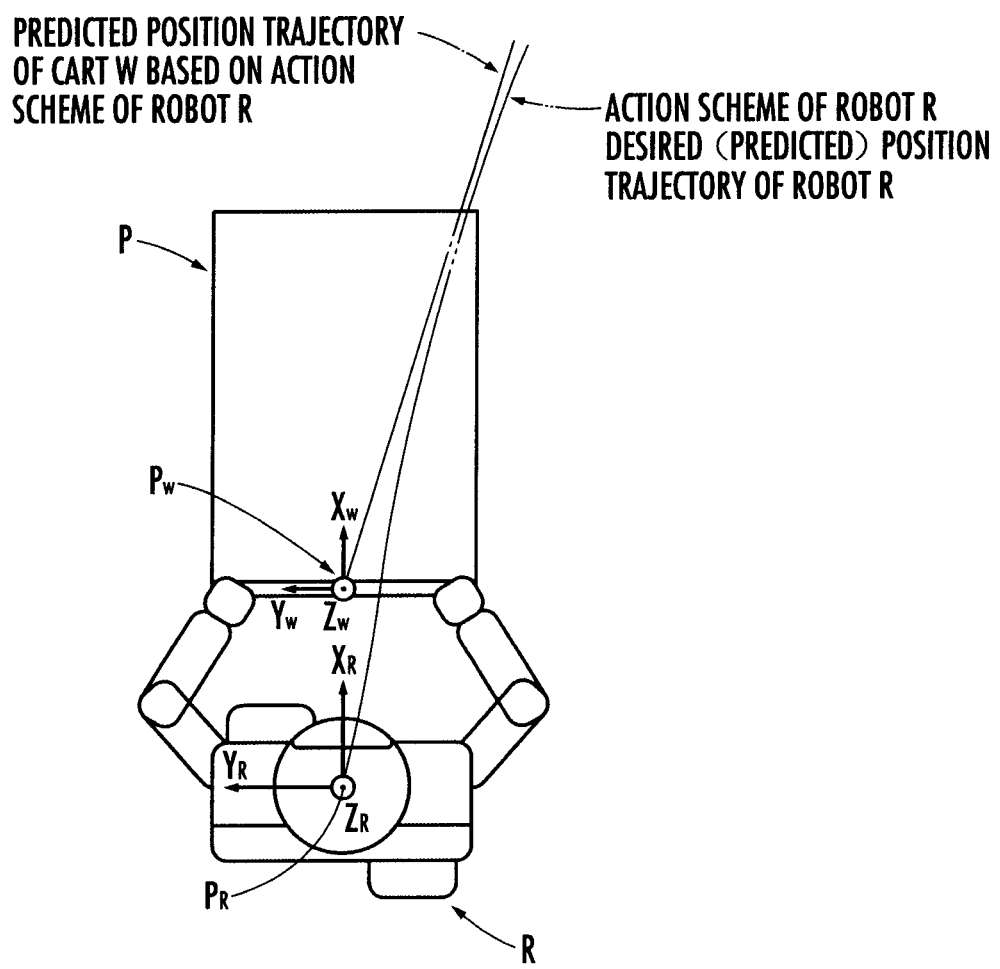
FIG. 4 is an explanatory diagram illustrating the positions and the azimuths of the robot and an object, respectively.

The functions of the robot R having the aforesaid construction, more specifically, the functions for traveling while moving a cart W as an object will now be described. The position and the azimuth of the robot R in a fixed coordinate system are defined by the position of an origin (e.g., the center of gravity of the robot R) $P_R$ of a robot coordinate system $(X_R, Y_R, Z_R)$ and the azimuth in a $+X_R$ direction (refer to FIG. 4). The front direction, the right direction, and the upper direction of the body 10 are defined as the $+X_R$ direction, the $+Y_R$ direction, and the $+Z_R$ direction, respectively. The cart W is equipped with a plurality of wheels WR capable of changing their directions about vertical axes, thus allowing the cart W itself to be moved by changing the directions of the wheels WR, as necessary, by rotating and changing the directions thereof with the wheels WR remaining in contact with a floor. The position and the azimuth of the cart W in the fixed coordinate system are defined by the position of an origin (e.g., the center of the horizontal portion of a handle H) $P_W$ of an object coordinate system ($X_W$, $Y_W$, $Z_W$) and the azimuth in $+X_W$ direction (the angle of the fixed coordinate system with respect to the +X direction) (refer to FIG. 4). On the lengthwise direction of the cart W, taking the portion where the handle H is attached as the rear side, the front direction, the right direction, and the upper direction of the cart W are defined as a $+X_W$ direction, a $+Y_W$ direction, and a $+Z_W$ direction, respectively. The cart W as the object may be replaced by a tray or any other object which can be moved by being held by one or both hands 13 of the robot R.

Figure 3:
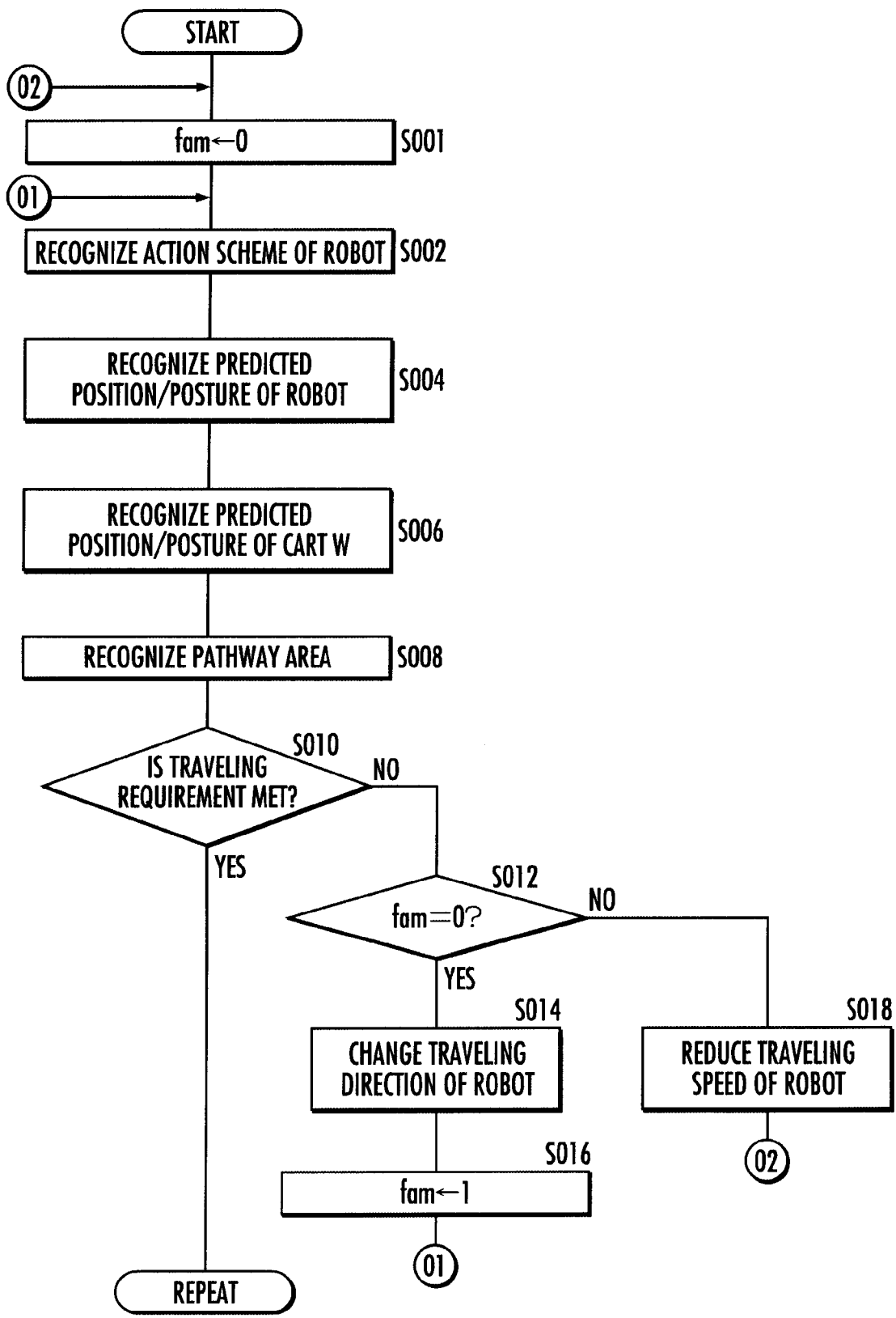
FIG. 3 is a flowchart illustrating the functions of the robot in accordance with the present invention.

First, a flag $f_{am}$ indicative of the change history of the traveling direction of the robot R in an action scheme for the robot R is reset to zero (S001 in FIG. 3). The first processor 21 recognizes the action scheme of the robot R (S002 in FIG. 3). Based on the action scheme of the robot R, a desired position trajectory indicating the time-series change of the desired position of the origin $P_R$ of the robot coordinate system in the fixed coordinate system and a desired azimuth trajectory indicating the time-series change of the desired azimuth in the $+X_R$ direction of the robot coordinate system are defined, as indicated by the two-dot chain line in FIG. 4. The traveling scheme of the robot R may be generated by the controller 20 on the basis of, for example, the output signals of the internal state sensor 101 and the external state sensor 102, respectively, or generated by a server (not shown) on the basis of a map data indicating a pathway configuration or the like, and the generated traveling scheme may be distributed to the robot R from the server.

Figure 5:
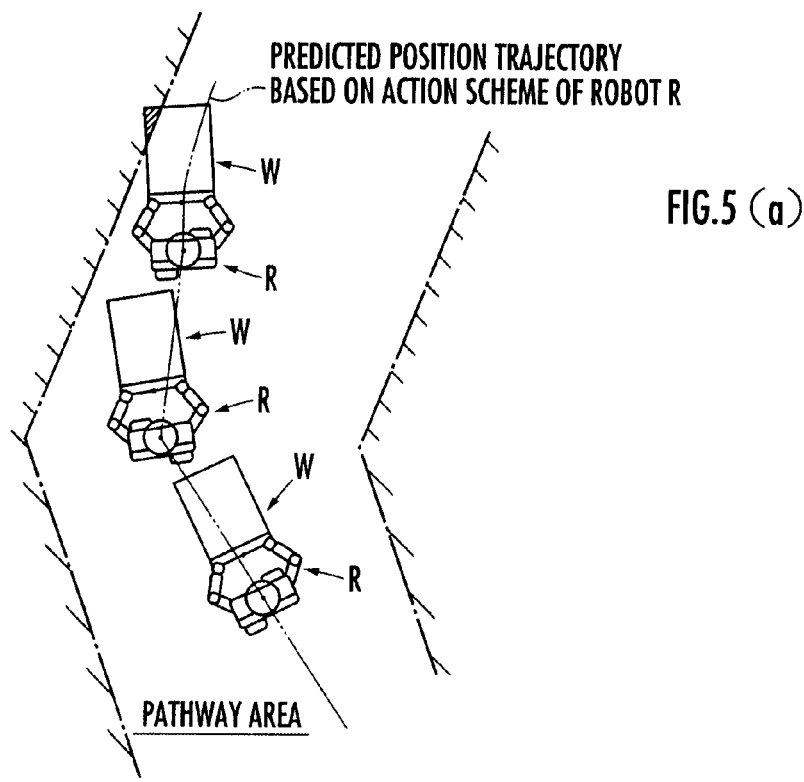
FIG. 5(*a*) and FIG. 5(*b*) are explanatory diagrams illustrating a method for correcting an action scheme of the robot in accordance with the present invention.
Figure 5:
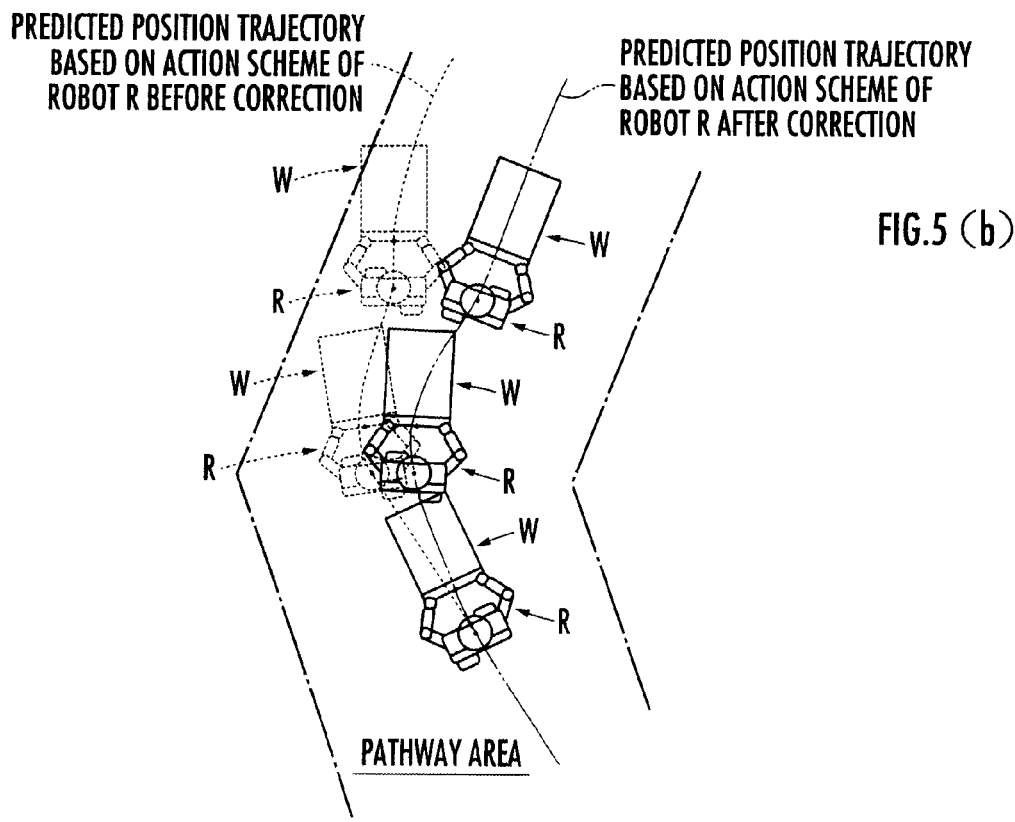

The first processor 21 also recognizes the predicted position and the predicted azimuth in the future of the robot R on the basis of the traveling plan of the robot R (S004 in FIG. 3). The controller 20 controls the action of the robot R such that the position of the robot R follows the desired position trajectory and the azimuth thereof follows the desired azimuth trajectory. Therefore, the position of the robot R at each point in the future defined by the desired position trajectory of the robot R is recognized as the predicted position. Further, the azimuth of the robot R at each point in the future defined by the desired azimuth trajectory of the robot R is recognized as the predicted azimuth. Thus, the predicted positions and the predicted azimuths of the robot R which change as illustrated in, for example, FIG. 5(a) are recognized.

Further, the first processor 21 recognizes the predicted position and the predicted posture of the cart W (S006 in FIG. 3). According to the action scheme, the robot R travels while moving the cart W such that the relative positions and azimuths with respect to the cart W remain within a predetermined range in a state wherein the robot R holds the handle H with its right and left hands 13, as indicated in FIG. 1. Hence, the position of the cart W defined in relation to the position of the robot R at each point in the future defined by the desired position trajectory of the robot R is recognized as the predicted position. Similarly, the azimuth of the cart W defined in relation to the azimuth of the robot R at each point in the future defined by the desired azimuth trajectory of the robot R is recognized as the predicted azimuth. Thus, the predicted positions and the predicted azimuths of the cart W which change as indicated in, for example, FIG. 5(a) are recognized.

The first processor 21 further recognizes a pathway area (S008 in FIG. 3). Thus, the pathway which curves in the middle, as illustrated in FIG. 5(a), is recognized as the pathway area. The pathway area is defined by a group of coordinate systems defined by the latitude (X component) and the longitude (Y component) in the fixed coordinate system. The pathway area may be read from a storage device of the robot R or retrieved from a database by the communication with a server.

Further, based on the recognition result supplied by the first processor 21, the second processor 22 determines whether the traveling requirement that the whole cart W and the whole robot R will remain within the pathway area in the future is met (S010 in FIG. 3). For this determination, the configuration (spatial spread) which has the representative point $P_R$ of the robot R as the reference thereof and the configuration (spatial spread) which has the representative point $P_W$ of the cart W as the reference thereof are recognized. If it is determined that the traveling requirement is met (YES in S010 of FIG. 3), then the control of the action of the robot R is continued according to the action scheme. Meanwhile, if it is determined that the traveling requirement is not met (NO in S010 of FIG. 3), then the third processor 23 determines whether the flag $f_{am}$ indicative of the change history of the traveling direction of the robot R in the action scheme for the robot R is zero (S012 in FIG. 3). For example, if it is predicted that a part of the cart W will step out of the pathway area in the future, as illustrated in FIG. 5(a), then it is determined that the traveling requirement is not met.

If it is determined that the flag $f_{am}$ is zero (YES in S012 of FIG. 3), then the third processor 23 corrects the action scheme so as to change the traveling direction of the robot R (S014 in FIG. 3) and changes the flag $f_{am}$ to 1 (S016 in FIG. 3). Thus, the action scheme of the robot R which has been corrected to change the traveling direction is recognized (S002 in FIG. 3). Then, the action of the robot R is controlled by the controller 20 according to the corrected action scheme, and a series of the above processing is repeated (refer to S004 in FIG. 3). If the traveling direction of the robot R is sequentially changed for a plurality of times, the flag $f_{am}$ may be changed from 1 to 0 on condition that the number of changes reaches a predetermined number or more.

Meanwhile, if it is determined that the flag $f_{am}$ is 1 rather than 0 (NO in S012 of FIG. 3), then the third processor 23 corrects the action scheme to reduce the traveling speed of the robot R (S018 in FIG. 3). Then, the flag $f_{am}$ is reset to zero (S001 in FIG. 3) and the action scheme of the robot R which has been corrected to reduce the traveling speed is recognized (S002 in FIG. 3). Subsequently, the controller 20 controls the action of the robot R according to the corrected action scheme and the aforesaid series of processing is repeated (refer to S004 in FIG. 3).

According to the robot R equipped with the aforesaid functions, if the traveling requirement that the robot R and the cart (object) W remain within a pathway area is not met, then the action scheme of the robot R is corrected so as to satisfy the traveling requirement (refer to S010, S014 and S018 in FIG. 3). More specifically, the action scheme of the robot R is corrected to change the traveling direction of the robot R (refer to S014 in FIG. 3) and the action scheme of the robot R is further corrected to reduce the traveling speed of the robot R, as necessary (refer to S018 in FIG. 3). Subsequently, the robot R travels while moving the cart W according to the corrected action scheme, thus enabling the robot R to travel while moving the cart W without having the cart W and the robot R itself stepping out of the pathway area. For instance, correcting the action scheme indicated by the dashed line in FIG. 5(b) to the action scheme indicated by the solid line (the desired position trajectory and the desired posture trajectory) securely prevents the robot R and the cart W from stepping out of the pathway area. In particular, reducing the traveling speed allows the robot R to make a greater change of its traveling direction than in the case where the traveling speed is not reduced. Hence, making a relatively large change of the traveling direction makes it possible to prevent an object and the robot R from stepping out of the pathway area.

What is claimed is:

1. A robot comprising a body, arms extended from the body, hands provided on distal ends of the arms, and a controller, wherein motions of the robot are controlled by the controller according to an action scheme when the robot travels while moving an object in a state of gripping the object by the hands and the object being in contact with a floor surface, wherein the controller comprises:
- a first processing element which recognizes a predicted position and a predicted azimuth in the future of the robot according to the action scheme, and defines a predicted position and a predicted azimuth in the future of the object based on each of the predicted position and the predicted azimuth of the robot, and which also recognizes a pathway area;
- a second processing element which determines, based on a result of recognition by the first processing element, a spatial broadening of the robot, and a spatial broadening of the object, whether a traveling requirement that the whole object and the whole robot will remain within the pathway area in the future is met; and
- a third processing element which corrects the action scheme on condition that the second processing element has determined that the traveling requirement is not met.

2. A robot according to claim 1, wherein the third processing element corrects the action scheme of the robot so as to change a traveling direction of the robot.

3. A robot according to claim 2,
wherein the second processing element determines whether the traveling requirement will be satisfied by changing the traveling direction of the robot, and
the third processing element corrects the action scheme of the robot to reduce a traveling speed of the robot on condition that the second processing element has determined that the traveling requirement will not be met after the traveling direction of the robot is changed.

4. A robot according to claim 2, wherein
the first processing element recognizes a corrected predicted position and a corrected predicted azimuth in the future of the robot according to the action scheme corrected by the third processing element, and defines a corrected predicted position and a corrected predicted azimuth in the future of the object based on each of the corrected predicted position and the corrected predicted azimuth of the robot, and
the second processing element determines, based on a result of recognition by the first processing element according to the action scheme corrected by the third processing element, the spatial broadening of the robot, and the spatial broadening of the object, whether the traveling requirement will be satisfied by changing the traveling direction of the robot.

5. A robot according to claim 4, wherein
the third processing element corrects the action scheme of the robot to reduce a traveling speed of the robot on condition that the second processing element has determined that the traveling requirement will not be met after the traveling direction of the robot is changed.

* * * * *